(12) United States Patent
Abbate

(10) Patent No.: US 8,023,978 B2
(45) Date of Patent: Sep. 20, 2011

(54) METHOD FOR PROVIDING ENHANCED FLOOR CONTROL FOR GROUP CALLS BETWEEN A DISPATCH COMMUNICATIONS NETWORK AND A CELLULAR TELEPHONE COMMUNICATIONS NETWORK

(75) Inventor: Alain D. Abbate, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 920 days.

(21) Appl. No.: 11/363,444

(22) Filed: Feb. 27, 2006

(65) Prior Publication Data

US 2007/0202905 A1    Aug. 30, 2007

(51) Int. Cl.
  *H04B 7/00* (2006.01)
  *H04M 1/00* (2006.01)
(52) U.S. Cl. ..................... 455/518; 455/552.1
(58) Field of Classification Search .......... 455/518, 455/517, 507, 500, 552.1, 516, 515, 519; 370/230
  See application file for complete search history.

(56) References Cited

U.S. PATENT DOCUMENTS

| | | | | |
|---|---|---|---|---|
| 5,912,882 | A * | 6/1999 | Yafuso et al. | 370/270 |
| 6,411,815 | B1 * | 6/2002 | Balasuriya | 455/512 |
| 7,266,382 | B2 * | 9/2007 | Noel et al. | 455/518 |
| 7,379,735 | B2 * | 5/2008 | Villa et al. | 455/426.1 |
| 7,522,584 | B2 * | 4/2009 | Kautz et al. | 370/354 |
| 7,536,191 | B2 * | 5/2009 | Luo et al. | 455/457 |
| 2002/0077136 | A1 * | 6/2002 | Maggenti et al. | 455/518 |
| 2003/0053434 | A1 * | 3/2003 | Chow et al. | 370/338 |
| 2003/0235184 | A1 | 12/2003 | Dorenbosch et al. | |
| 2004/0127233 | A1 * | 7/2004 | Harris et al. | 455/458 |
| 2004/0190496 | A1 | 9/2004 | Albal et al. | |
| 2004/0192353 | A1 * | 9/2004 | Mason et al. | 455/457 |
| 2004/0219940 | A1 * | 11/2004 | Kong et al. | 455/518 |
| 2005/0041625 | A1 | 2/2005 | Brewer | |
| 2005/0058070 | A1 * | 3/2005 | Burghardt et al. | 370/230 |
| 2005/0124365 | A1 * | 6/2005 | Balasuriya et al. | 455/518 |
| 2005/0124565 | A1 | 6/2005 | Diener et al. | |
| 2005/0260988 | A1 * | 11/2005 | Kauppinen | 455/435.3 |

(Continued)

FOREIGN PATENT DOCUMENTS

WO    2007100973 A2    9/2007

(Continued)

OTHER PUBLICATIONS

PCT International Preliminary Report Application No. PCT/US2007/062049 Dated Sep. 12, 2008—8 pages.

(Continued)

*Primary Examiner* — Christopher M Brandt
(74) *Attorney, Agent, or Firm* — Barbara R. Doutre

(57) ABSTRACT

A method for providing enhanced floor control (500) between a dispatch communications network and a cellular telephone communications network includes transmitting a transmit delay message (517) by a network control entity (505) to a communications device (501) in the cellular telephone network when a talk reservation request (515) has first been granted to a communications device (507) in the dispatch network. A transmit grant message (521) is then transmitted from the network control entity (505) to the communications device (501) in the cellular telephone network when the communications device in the dispatch network switches from a transmit mode to receive mode (507). The transmit grant message signals the communications device (501) in the cellular telephone network enabling it to access the dispatch communications network without sending a second talk reservation request.

17 Claims, 8 Drawing Sheets

U.S. PATENT DOCUMENTS

| | | | |
|---|---|---|---|
| 2006/0035657 A1* | 2/2006 | Lim | 455/518 |
| 2006/0040685 A1* | 2/2006 | Kwon | 455/507 |
| 2006/0084455 A1* | 4/2006 | Schwagmann et al. | 455/518 |
| 2006/0229093 A1* | 10/2006 | Bhutiani et al. | 455/518 |
| 2007/0019595 A1* | 1/2007 | Huh et al. | 370/338 |
| 2007/0049314 A1* | 3/2007 | Balachandran et al. | 455/518 |
| 2008/0298308 A1* | 12/2008 | Hannu et al. | 370/328 |

FOREIGN PATENT DOCUMENTS

| | | |
|---|---|---|
| WO | 2007100973 A3 | 9/2007 |

OTHER PUBLICATIONS

PCT International Search Report Application No. PCT/US2007/062049 Dated Dec. 21, 2007—8 pages.

* cited by examiner

US 8,023,978 B2

METHOD FOR PROVIDING ENHANCED FLOOR CONTROL FOR GROUP CALLS BETWEEN A DISPATCH COMMUNICATIONS NETWORK AND A CELLULAR TELEPHONE COMMUNICATIONS NETWORK

FIELD OF THE INVENTION

The present invention relates generally to two-way radio communications systems and more particularly to a wireless dispatch system that includes talk-reservation and control.

BACKGROUND

In wireless communication systems offering half duplex group call services, only one member of the group is permitted to transmit at a time while all other group members receive communications. Those skilled in the art will recognize that the transmit mode is a mode in which the user is talking or sending data while the receiving mode operates in a passive listening state. Once a talking group member stops transmitting, any of the other group members that desire to reply, can press a push-to-talk (PTT) button on their transceiver to request to transmit. If more than one group member wishes to transmit, the user that was first to request this status is first granted—while any later requests are denied. This is illustrated in FIGS. 1 and 2.

Prior art FIG. 1 illustrates a half duplex radio system 100 where each of transceivers 101, 103 and 105 are controlled by network control entity 107 in a communications network 109. FIG. 2 is a diagram showing how a transceiver 103 who is first to submit a transmit request is granted that request. In this illustration, the PTT on transceiver 103 is pressed, a transmit request is transmitted 201 to the network control entity 107. The network control entity then grants the transmit request 203 to the transceiver 103. If a subsequent transmit request 205 is made by the transceiver 101, the network control entity 107 will deny that request 207 and the transceiver 101 will be unable to transmit on the network until the PTT on transceiver 103 is released and stops transmitting 209.

Hence, this first-come, first-served, approach works well when all members of the group have a similar response time to their PTT requests from the network. However, the first-come, first-served, floor control does not work well if some members of the group have a significantly slower PTT request response from the network. It can be very difficult for a group member, with a slow response to a PTT request time, to get an opportunity to talk by the time the slow request is received by the network. This occurs since some other members of the group may have already started to transmit in which case this delay or latency is detrimental to the slower user.

As seen in prior art FIG. 3, one situation where the PTT request response time is particularly problematic occurs when using two networks 300. In this example, some members of the group are part of one wireless network 109 (i.e., an Association of Public Safety Communications Officials (APCO) network) and other members of the group are interconnecting from a second network 303 (i.e., a cellular telephone network). In this illustration, a cell phone 301 is operating in a cellular network 303 and the APCO control and bearer (voice) information is carried over an Internet protocol (IP) data connection on the cellular network 303. The IP data connection is carried through a gateway 305 which accesses the APCO network 109. The problem associated with this type of network interconnect arrangement is that it can introduce a very significant PTT request delay to the cell phone 301 over the cellular telephone network 303 that is attempting to communicate in the APCO network 109. FIG. 4 illustrates another timing diagram 400 showing how the messages are sent from two separate communications networks. In this illustration, a transmit request 401 is sent from transceiver 103 to the network control entity 107 where a transmit request message 403 is subsequently granted and from the network control entity to the transceiver 103. In view of the PTT latency delay, even if the cell phone 301 transmits a request before the transceiver 103, it is often delayed such that the request 405' will be denied 407/407' by the network control entity 107 since it was received after the request to transceiver 103 was granted. Accordingly, there should be some method to allow a user using the cell phone 301 to gain access to the first network in view the latency in the transmit request.

The prior art also discusses various approaches for dealing with transmit request latency. U.S. Patent Publication No. 2005/0041625, which is herein incorporated by reference, describes an approach for reducing PTT latency in interconnected code division multiple access (CDMA) networks by selecting between two call establishment strategies based on the network signaling capabilities. A slow guaranteed setup is used if it is necessary to allocate a traffic channel to communicate with a Group Communication Server (GCS). A faster optimistic strategy is used if the network permits the subscriber to send control data to the GCS without first allocating a traffic channel. This approach allows existing control messages to be sent faster in an interconnected network environment, rather than making use of a new type of control message to gain floor control in a different fashion.

U.S. Patent Publication No. 2004/0190496, which is herein incorporated by reference, discloses a method for interconnecting cellular systems to an integrated digital enhanced network (iDEN) system to provide group call services. A Voice Signaling Gateway (VSGW) converts non-iDEN signaling to iDEN signaling, allowing non-iDEN subscribers to participate in group calls. This approach does not extend the existing iDEN group call setup protocol to provide a talk-reservation capability.

Finally, U.S. Patent Publication No. 2003/0235184, which is also herein incorporated by reference, adds extensions to real time protocol (RTP) message headers for group call floor control. In this approach, a request to talk is denied if another member of the talk group is currently talking.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
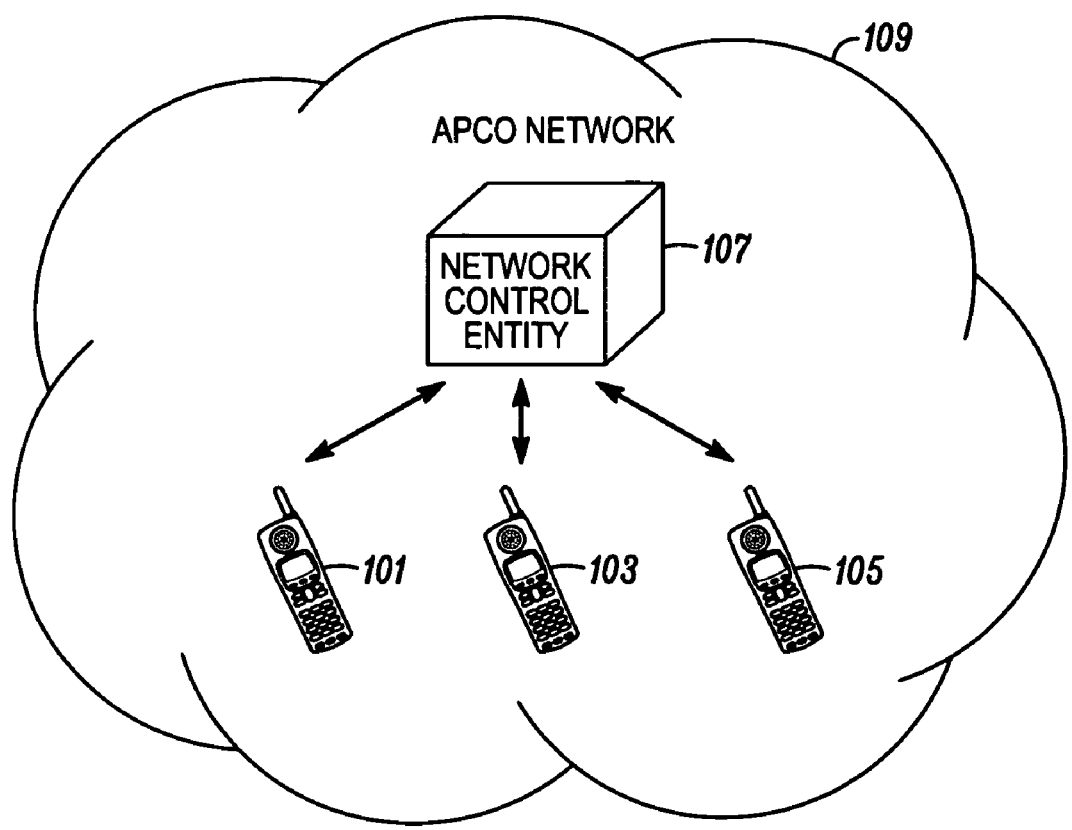
FIG. 1 is a prior art block diagram illustrating a communications system using a network control entity in accordance with some embodiments of the invention.
Figure 2:
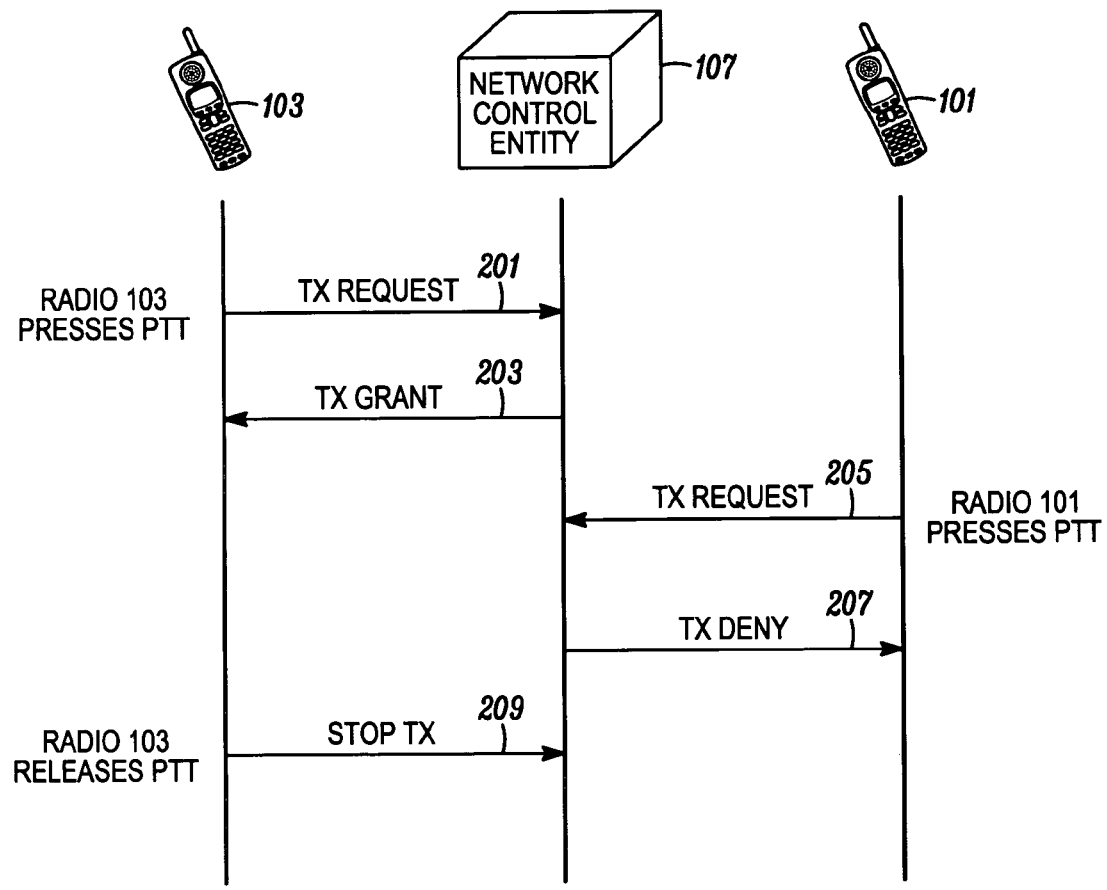
FIG. 2 is a prior art block diagram illustrating communications access on a first-come, first-served, basis.
Figure 3:
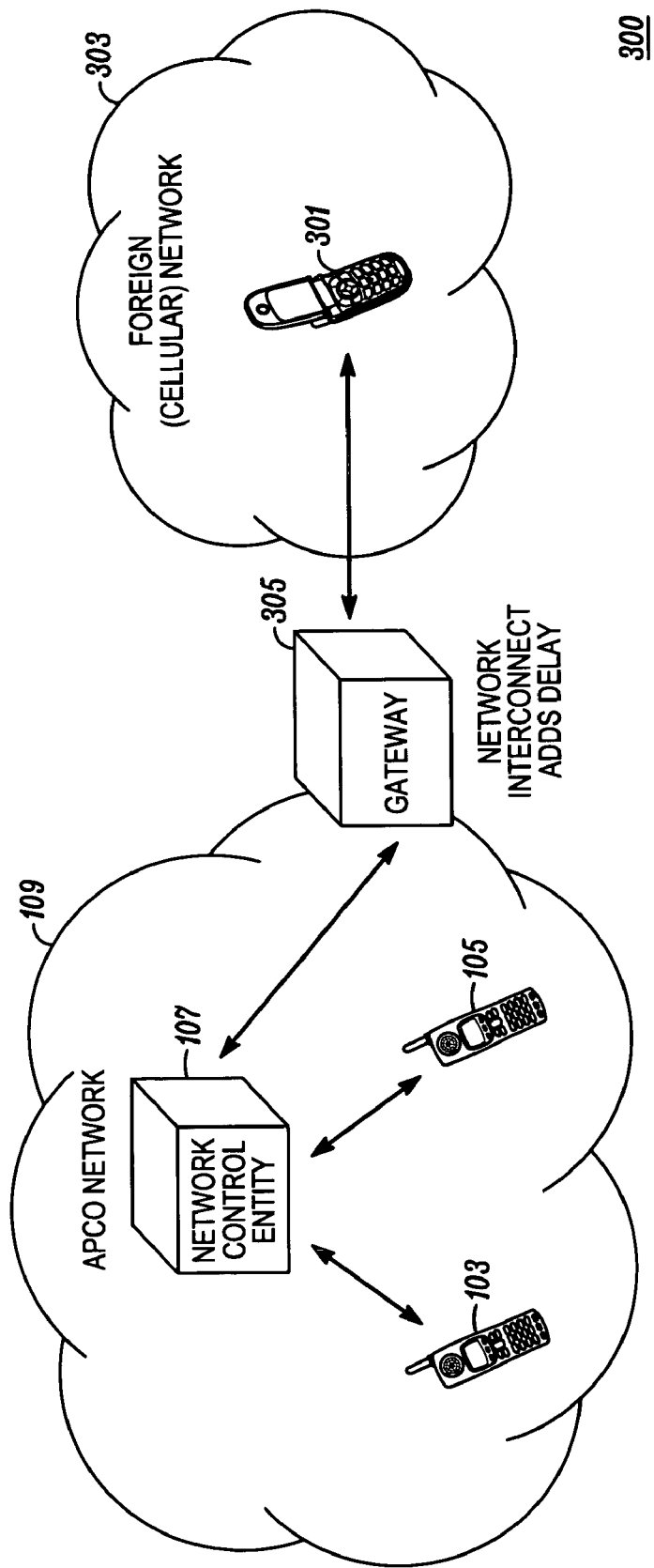
FIG. 3 is a prior art block diagram illustrating a radio communicating from a foreign network through the network gateway.
Figure 4:
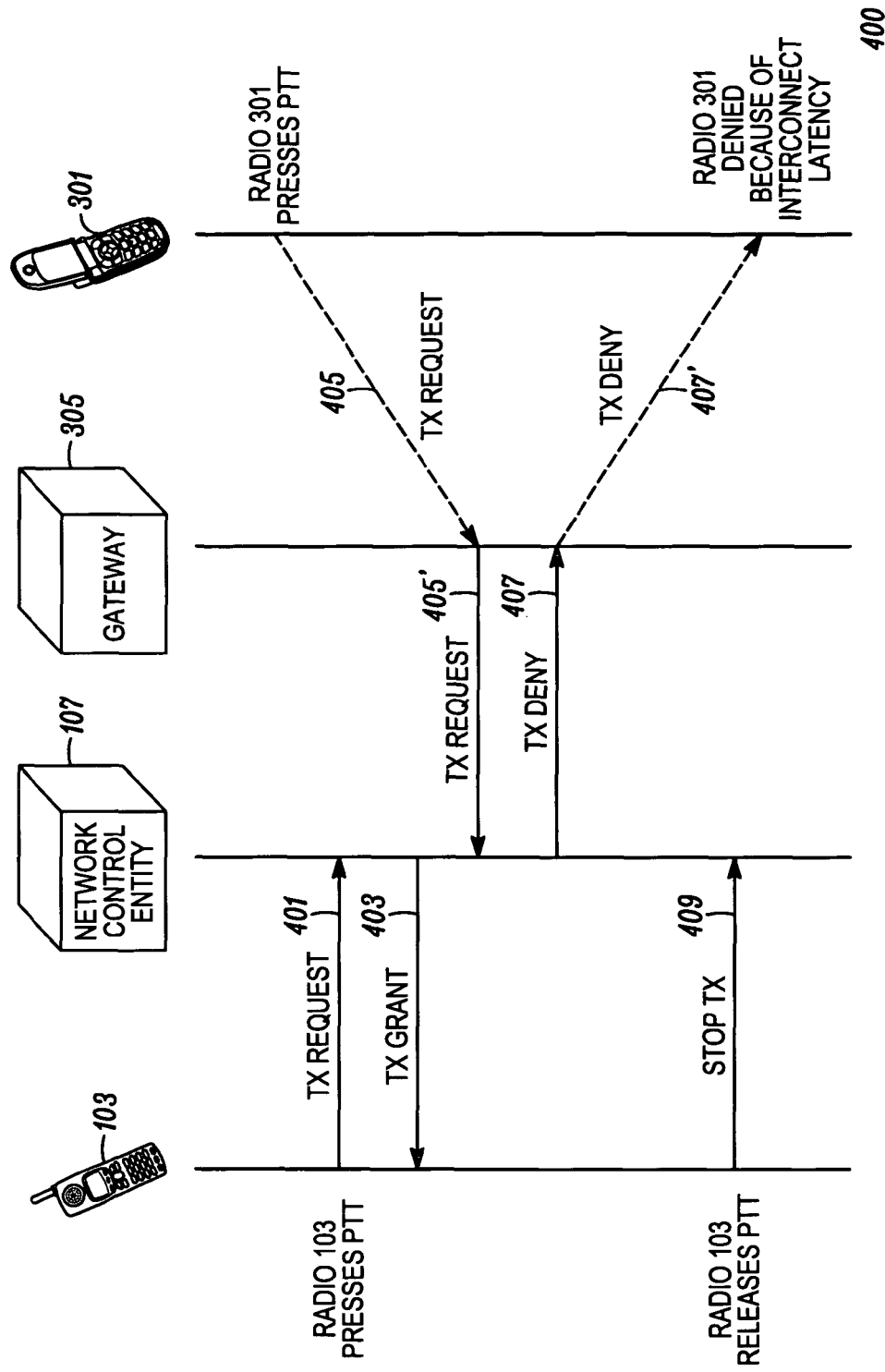
FIG. 4 is a prior art diagram illustrating interconnection between networks where latency is introduced.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a communications system and method with enhance floor control for group calls. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a communications system and method with enhanced floor control for group calls described herein. The non-processor circuits may include, but are not limited to, a radio receiver, a radio transmitter, signal drivers, clock circuits, power source circuits, and user input devices. As such, these functions may be interpreted as steps of a method to perform a communications system with enhance floor control for group calls. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present invention is a wireless dispatch system including subscriber radio transceivers and a network control entity (NCE) which manages group calls. The subscriber radios send call control signaling messages to the NCE, including a message to request to transmit. The NCE in turn determines which subscriber is permitted to transmit. The invention includes a system and method for providing a new type of talk-reservation call control message that allows a listening group call member to request to talk as soon as the currently talking member stops talking. Thus, this "talk-reservation" approach is analogous to raising your hand during a group meeting as a polite request to talk as soon as the current talker finishes.

Figure 5:
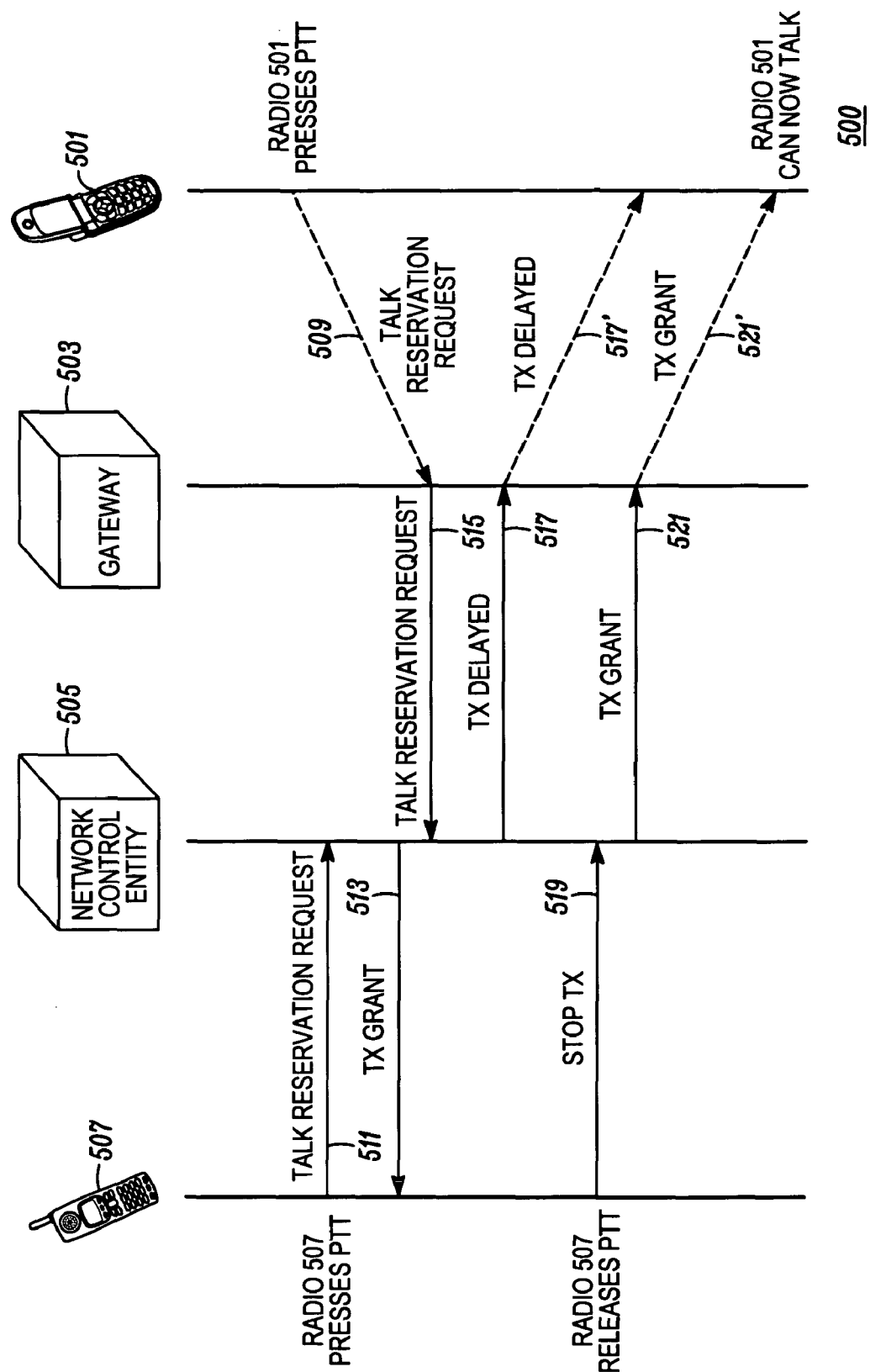
FIG. 5 is a diagram illustrating enhanced floor control using a talk reservation request.

As seen in FIG. 5, a transmission timing diagram 500 illustrates how a talk-reservation is sent from cellular telephone 501 through the gateway 503 to the NCE 505. If no other member of the talk group is currently talking, cellular telephone 501 is immediately given permission to transmit. If another member of the talk group, such as transceiver 507 is talking when the talk-reservation message is received, radio transceiver 507 is allowed to continue to talk. When radio transceiver 507 stops talking, the talk-reservation request is honored by the NCE 505 and the NCE 505 grants floor control to cellular telephone 501. Thus, the message timing diagram illustrates an initial talk reservation request 509 initiated by cellular telephone 501 where radio transceiver 507 also initiates a request 511 thereafter. Since the request from radio transceiver 507 was first received by NCE 505, a transmit request grant 513 is granted to the radio transceiver. Thereafter, the talk reservation request 515 sent by the cellular telephone 501 is received by the NCE 505. Rather than having the user of the cellular telephone 501 make continued attempts to access the dispatch network, the NCE 505 sends a transmit delayed message 517/517' to the cellular telephone 501. When the user of the radio transceiver 507 stops transmitting and releases the PTT 519, the NCE 505 sends a transmit grant message 521/521' to the cellular telephone 501 indicating to the user of the cellular telephone 501 that the user has access to the second communications system.

Figure 6:
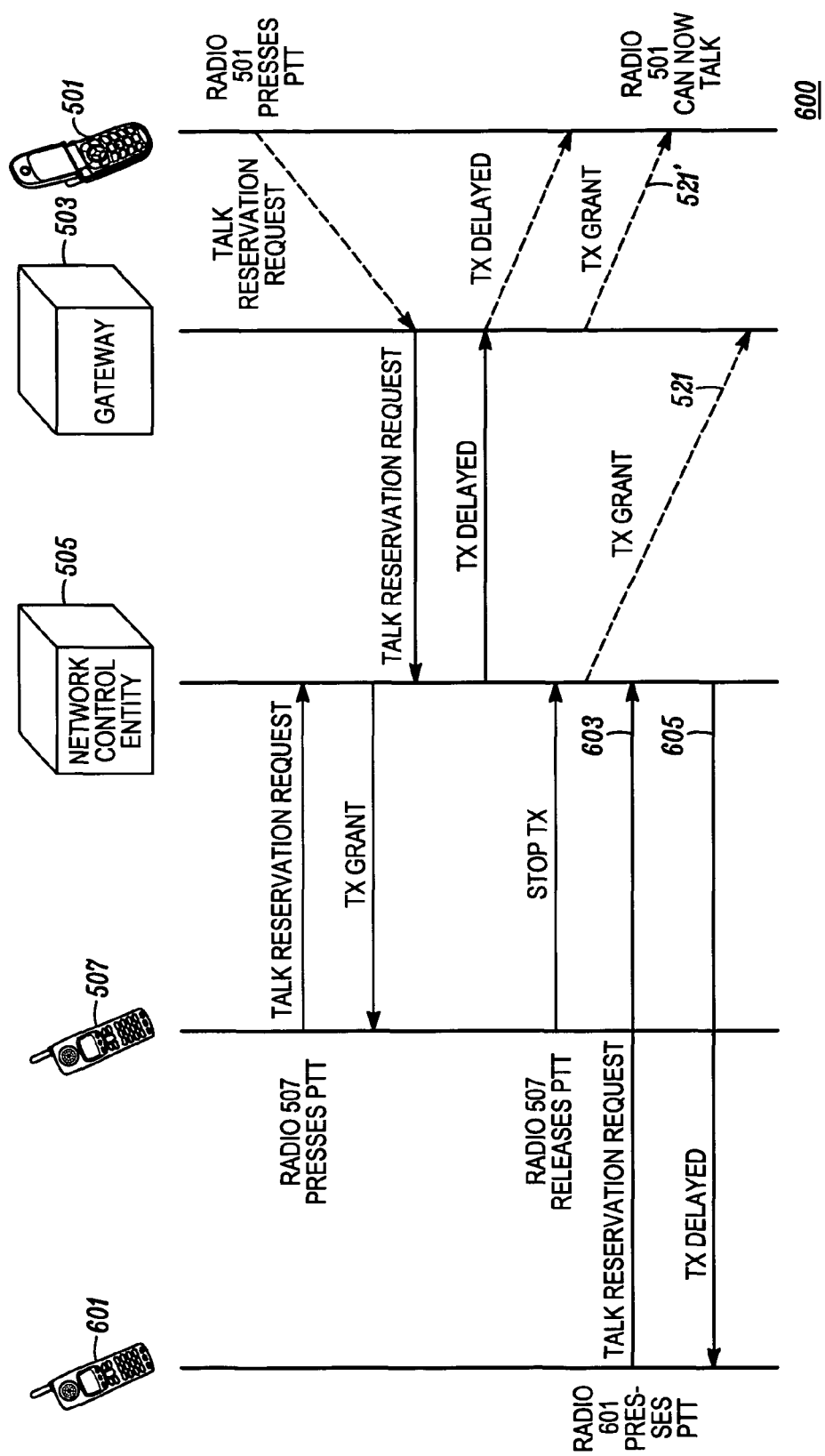
FIG. 6 is a diagram illustrating the use of a enhanced floor control to allow a radio from a foreign network to transmit while a radio from the local network is delayed.

In FIG. 6, another timing diagram 600 illustrates the process as described in FIG. 5, although in this example, another radio transceiver 601 submits a talk reservation request 603 after the transmit grant message 521/521' is sent to the cellular telephone 501. In this instance, the NCE 505 sends a transmit delayed message 605 to the radio transceiver 601 operating in the dispatch network so that cellular telephone's 501 use of the dispatch network is uninterrupted. Once the cellular telephone 501 has finished its transmission, a talk reservation request by radio transceiver 601 will be granted.

Figure 7:
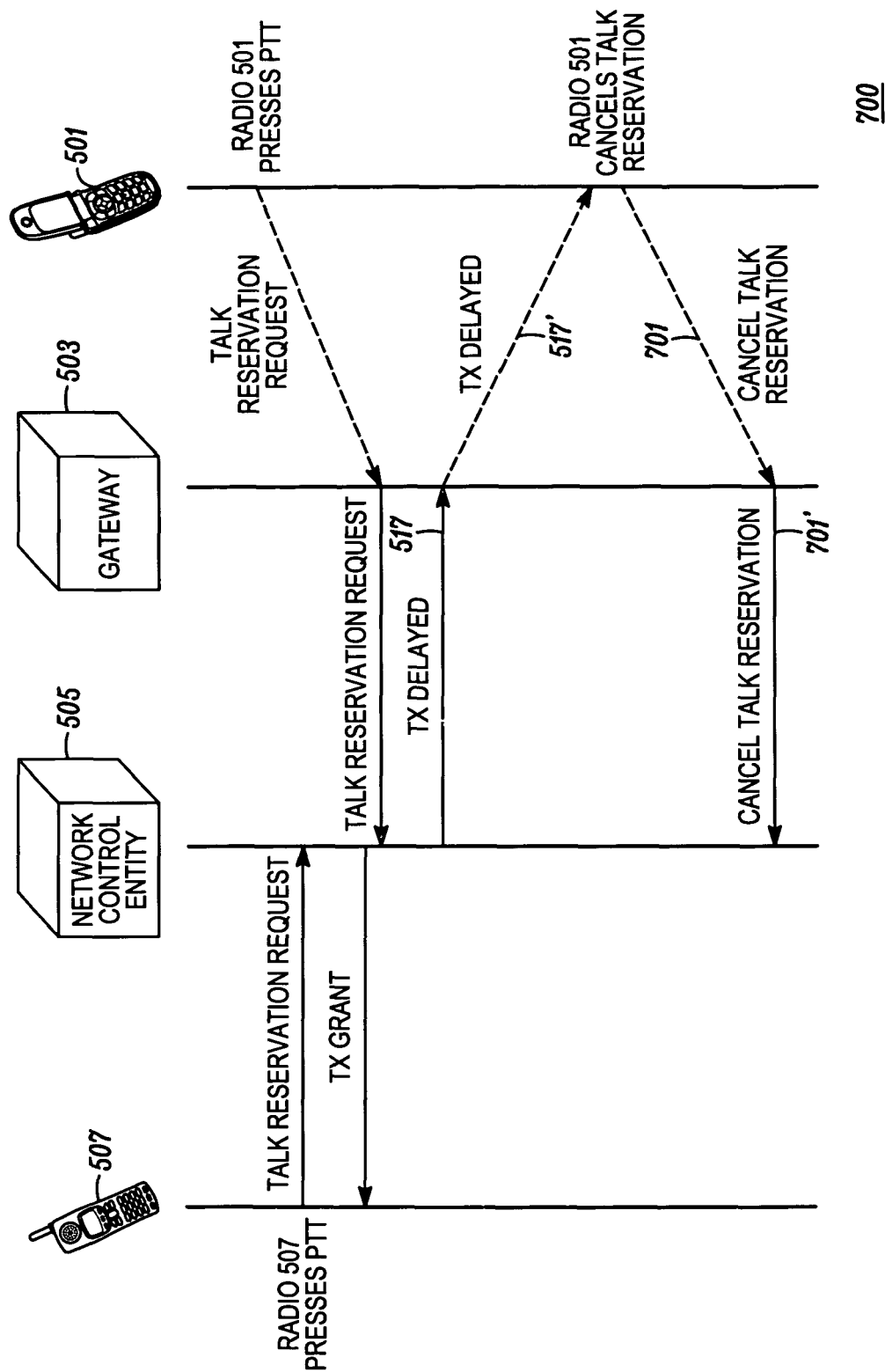
FIG. 7 is a diagram illustrating the use of user cancellation of a talk reservation.

In FIG. 7, yet another embodiment illustrates a timing diagram 700, in which cellular telephone 501 can choose to cancel the talk-reservation request while waiting for radio transceiver 507 to finish talking. If cellular telephone 501 is interconnecting to a dispatch network (e.g., APCO) from a foreign network (e.g., a cellular network), there could be a significant delay before the cellular telephone 501 could actually start transmitting (due to delays in exchanging control messages and/or setting up a voice channel across the networks). During this delay interval, the NCE 505 will not allow any other members of the talk group to initiate transmission. Once the transmit delayed message 517/517' has been sent to the cellular phone 501, it may also be used to cancel the reservation. This is accomplished using a cancel talk reservation message 701/701' that is sent from the cellular telephone 501 to the gateway 503 and then to the NCE 505. This permits a user to cancel the talk reservation if no longer required, enabling other users to gain access to the dispatch system more quickly.

Figure 8:
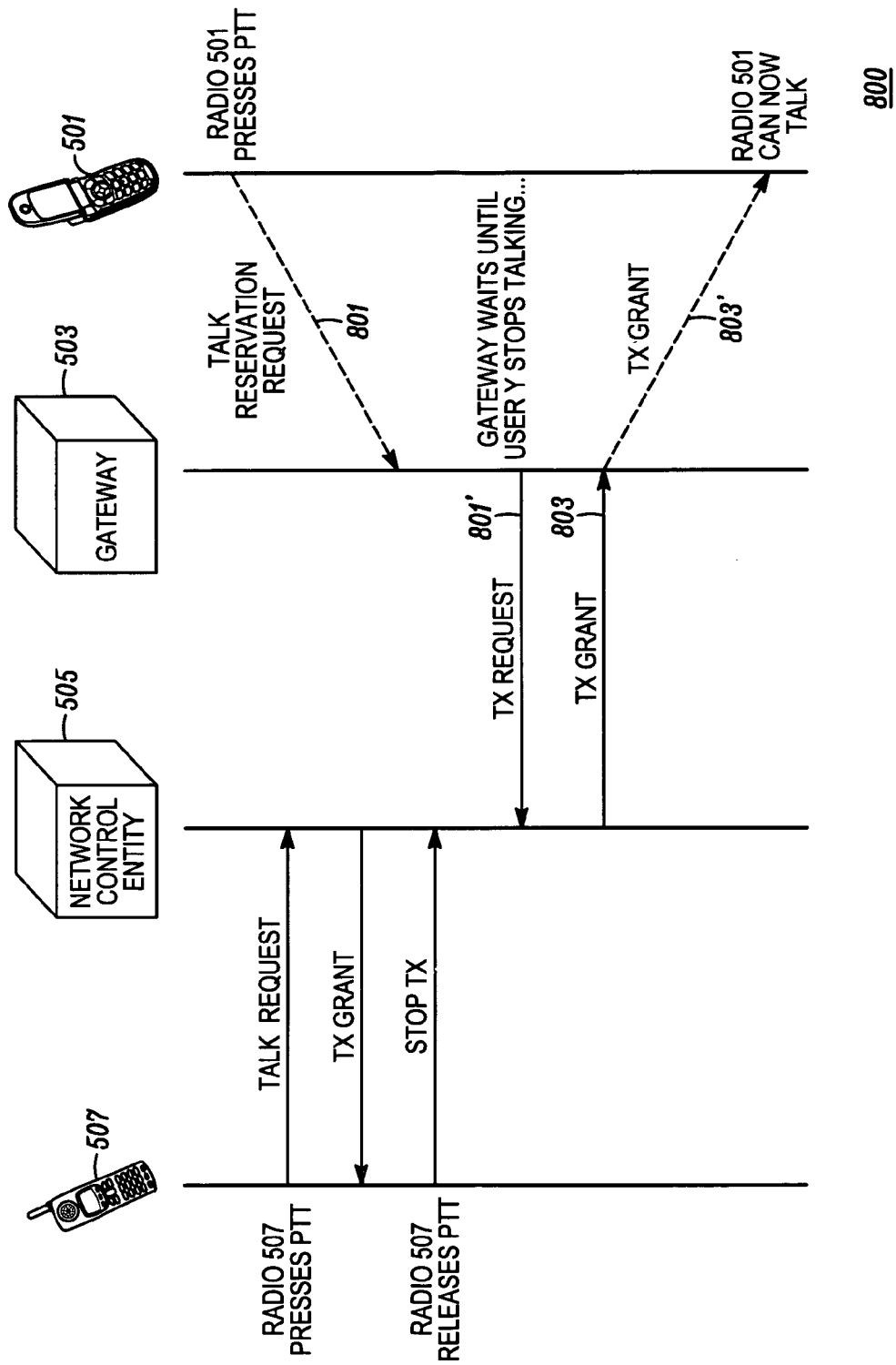
FIG. 8 is a diagram illustrating use of an alternative gateway for managing talk reservation where no changes to protocol messages are needed in the original network.

FIG. 8 is a timing diagram 800 illustrating still another variation of the system. This diagram depicts the cellular telephone 501 sending the talk reservation message 801 to the gateway 503, interconnecting the cellular network 303 to the APCO network 109. In this embodiment, the gateway 503 does not send the talk reservation request to the NCE 505. When the gateway 503 detects that radio transceiver 507 has stopped talking, the gateway 503 will send a transmit request message 801' on behalf of the cellular telephone 501. Because the gateway 503 can directly access the dispatch network, the gateway 503 can make this request in a timely fashion. At some later time, the NCE 505 will send a transmit grant message 803/803' to the cellular telephone 501 to grant the transmit request. This embodiment provides a simpler approach since no transmit delay messages need be transmitted from the NCE 505.

Thus, the prior art demonstrates an existing approach to handling a PTT request while another subscriber is transmitting, that is, to attempt to interrupt the currently transmitting subscriber. This "interrupt" approach is not an orderly transfer of control. If a radio transceiver is able to preempt a radio transceiver that is initially transmitting, the first speaker will be interrupted before the speaker can finish the transmission. In this example, the first speaker may not even be aware that the speaker has been cut off. In contrast, the present invention allows a network signaling extension where a subscriber can gain floor control without interrupting a currently transmitting subscriber.

Those skilled in the art will recognize that this invention can be utilized in the context of an Integrated Wireless Network (IWN) system in which subscribers on a cellular network can be interconnected to a public safety dispatch network such as that defined by the APCO standard. The network interconnect can introduce delays in both control data (the signaling messages used to manage calls) and bearer data (the data stream carrying voice). For example, when the voice bearer data is sent over the cellular data connection, several voice frames may be buffered up before sending the first frame, thus introducing a delay. This approach will mitigate floor control problems resulting from these delays.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method for providing enhanced floor control between a dispatch communications network and a cellular telephone communications network, the method comprising a network control entity:

receiving a first talk reservation request from a first communications device operating in the dispatch telephone communications network, the first talk reservation request for establishing communications on the dispatch communications network;

transmitting a first transmit grant message to the first communications device in response to receiving the first talk reservation request, the first transmit grant message granting a floor to the first communications device;

after transmitting the first transmit grant message, receiving a second talk reservation request from a second communications device operating in the cellular telephone communications network, the second talk reservation request for establishing communications on the dispatch communications network, the second talk reservation request being transmitted through a gateway to the network control entity;

when the second talk reservation request is received before the first communications device switches from a transmit mode to a receive mode, transmitting a transmit delay message to the second communications device through the gateway in response to receiving the second talk reservation request, the transmit delay message indicating to the second communications device to delay transmission until a second transmit grant message is received by the second communications device; and transmitting the second transmit grant message to the second communications device through the gateway after the first communications device switches from the transmit mode to the receive mode, the second transmit grant message transmitted without having received a new talk reservation request from the second communications device.

2. The method of claim 1, wherein the second talk reservation request is transmitted by the second communications device prior to the first talk reservation request being transmitted by the first communications device.

3. The method of claim 1, further comprising the network control entity:

prior to transmitting the second transmit grant message to the second communications device, receiving a cancel talk reservation message from the second communications device through the gateway when the second communications device no longer wishes to communicate on the dispatch communications network; and cancelling transmission of the second transmit grant message to the second communications device in response to receiving the cancel talk reservation message such that the second transmit grant message is not transmitted to the second communications device after the first communications device switches from the transmit mode to the receive mode.

4. The method of claim 1, further comprising network control entity delaying the granting of additional talk reservation requests in the dispatch communications network until the second communications device has completed transmitting in the dispatch communications network.

5. The method of claim 4, wherein delaying the granting of additional talk reservation requests in the dispatch communications network comprises:

after the first communications device switches from the transmit mode to the receive mode, receiving a third talk reservation request from a third communications device operating in the dispatch telephone communications network, the third talk reservation request for establishing communications on the dispatch communications network;

transmitting a transmit delay message to the third communications device in response to receiving the third talk reservation request and prior to the second communications device switching from a transmit mode to a receive mode, the transmit delay message indicating to the third communications device to delay transmission until a third transmit grant message is received by the third communications device; and transmitting the third transmit grant message to the third communications device after the second communications device switches from the transmit mode to the receive mode, the third transmit grant message transmitted without having received a new talk reservation request from the third communications device.

6. The method of claim 5, wherein the third talk reservation request is received after the second transmit grant message is transmitted.

7. The method of claim 1, wherein the transmit delay message is transmitted to the second communications device prior to the first communications device switching from the transmit mode to the receive mode.

8. The method of claim 1, wherein the second talk reservation request is received by the network control entity after the first communications device switches from the transmit mode to the receive mode.

9. The method of claim 8, further comprising the gateway:

receiving the second talk reservation request from the second communications device prior to the first communications device switching from the transmit mode to the receive mode and after the first communications device has been granted the floor by the network control device; and delaying transmission of the second talk reservation request until after the first communications device has switched from the transmit mode to the receive mode as a result of having received the second talk reservation request and the first communications device having been granted the floor.

10. The method of claim 9, wherein the network control device does not transmit the transmit delay message when the second talk reservation request is received by the network control entity after the first communications device switches from the transmit mode to the receive mode.

11. The method of claim 1, wherein the first and second communications devices are end devices operable by a user to originate an audio message.

12. The method of claim 1, wherein the first communications device is a two-way radio transceiver and the second communications device is a cellular telephone.

13. The method of claim 1, wherein the gateway is a voice over Internet protocol (VoIP) communication.

14. The method of claim 1, wherein the dispatch network operates using the Association of Public Safety Communications Officials (APCO) standard.

15. A method for providing enhanced floor control, the method comprising a network control entity:

receiving a talk reservation request from a cellular telephone in a cellular network while a radio transceiver in a dispatch network has the floor;

indicating to the cellular telephone, without denying the talk reservation request, that the floor will be granted to the cellular telephone but at present is being delayed and that a new talk reservation request from the cellular telephone is not needed to grant the floor; and granting the floor to the cellular telephone after the radio transceiver surrenders the floor without having received another talk reservation request from the cellular telephone.

16. The method of claim 15, wherein the receiving and granting of the talk reservation request occurs in the dispatch network and communication with the cellular telephone occurs through a gateway.

17. The method of claim 15, wherein the granting comprises granting the floor to the cellular telephone after the radio transceiver surrenders the floor only if a cancellation message from the cellular telephone has not been received between when talk reservation request has been received and when the radio transceiver surrenders the floor.

* * * * *